United States Patent [19]

Snyder

[11] Patent Number: 4,891,900
[45] Date of Patent: Jan. 9, 1990

[54] JIGGING SPOON

[75] Inventor: Gary L. Snyder, Dodge Center, Minn.

[73] Assignee: UMM Holdings, Inc., Dodge Center, Minn.

[21] Appl. No.: 289,729

[22] Filed: Dec. 27, 1988

[51] Int. Cl.4 ............................................. A01K 85/00
[52] U.S. Cl. ..................................... 43/42.5; 43/42.51; 43/42.52
[58] Field of Search ................. 43/42.32, 42.33, 42.34, 43/42.50, 42.51, 42.52

[56] References Cited

U.S. PATENT DOCUMENTS

| | | | |
|---|---|---|---|
| 2,484,747 | 10/1949 | Russell | 43/42.5 |
| 2,593,027 | 5/1949 | Heino | 43/42.5 |
| 2,809,462 | 5/1954 | Wallis | 43/42.5 |
| 3,169,337 | 8/1963 | McGregor | 43/42.5 |
| 3,497,986 | 3/1968 | Bianco | 43/42.5 |
| 4,155,192 | 5/1979 | Varaney | 43/42.5 |
| 4,574,514 | 3/1986 | Kingston | 43/42.5 |
| 4,700,503 | 10/1987 | Pippert | 43/42.5 |

Primary Examiner—Nicholas P. Godici
Assistant Examiner—Mike Starkweather
Attorney, Agent, or Firm—Douglas L. Tschida

[57] ABSTRACT

A flat metal fishing lure stamp formed to exhibit a V-shaped profile over the length of the body, when viewed end on, and wherein the apex of said V-shaped body is arcuately formed over its length at a predetermined radius of curvature. Line and hook receiving apertures are formed in the opposite body ends and colored attractant decals are secured to the body.

10 Claims, 4 Drawing Sheets

JIGGING SPOON

BACKGROUND OF THE INVENTION

The present invention relates to fishing lures and in particular to a jigging spoon having a flash producing wobbling action when falling and/or a side-to-side swimming action, when drawn in a forward direction, such as when the lure is presented with a lifting/falling action relative to a stationary of slowly moving boat.

Over the history of artificial lures for sport fishing, a variety of distinguishable classes of lure types have evolved, whether hand made or machine-made. Such lure types vary from surface lures to diving lures to spinner baits to jigging lures, among still other classes of lure types. Depending upon the class of lure, lure action during presentation is induced either by rod control, line retrieval or a trolling motion using the boat's motor, water movement or a combination of the above.

Relative to the present invention and of the foregoing classes of lure types, jigging lures are particularly fished in contact with or close contact to the bottom structure of a waterway and rely on rod control, since the lure body is inherently designed to induce no particular motion or action when moved through the water. That is, jig bodies historically have been constructed in non-aerodynamic shapes from molded lead which is formed directly about the shank of a single hook. The body or head is painted with a desired color and one or more filamentary body components are added, either at the lure manufacture's discretion or, more recently, by the fisherman with the securing of a suitably colored vibrating tail member to the lure. Attractant motion thereby principally being achieved from the filamentary components. Recent jig constructions have also sought to better present the hook and attached live bait, when the lure is in contact with the bottom.

While jig type lures have proven to be especially effective when the fish are holding close to bottom structure, Applicant has determined that in many instances, especially river fishing, it is preferable that the lure body exhibit some type of inherent motion as it is fished to further trigger a fish strike. Applicant accordingly has developed a sub or hybrid class of lures falling between jigs and crankbaits which are commonly referred to as swimming jigs. These lures represent a hybrid lure in that they are relatively heavy and are intended to be fished with a lifting/falling rod action in close relation to the bottom, but wherein during the fall action, the lure moves due to the body shape. Such movement may also be induced with lateral lure movement.

Two of such lures are offered by Applicant under the trademarked brand names Walleye Hawger ™ and Rocker Minnow ™. Whereas, the former lure is of a traditional molded lead construction and is formed about a hook shank; the latter is of a solid cast body construction and to which a treble hook is separately attached. These lures generally exhibit an oblong arcuate body shape and from which shapes desirable swimming actions are partially obtained. The cost of fabrication of such lures however is relatively high. Moreover, it is believed that the swimming action may be enhanced and the fall time of the lure slowed by appropriately including a concavity in the body.

Applicant by way of the present invention therefore has developed a spoon-like lure including the attributes of his swimming jigs. This lure more closely approximates the lure class referred to as jigging spoons. Various commonly fished member of this class of lures can be seen in various articles in "The In-Fisherman", Book No. 82, pp. 53-65, 71-79, and 89-96 (Dec.- Jan., 1989). Some of the depicted lures are constructed from sheet metal which is stamped to form, but which lures normally are flat across the width and over the length of the lure body and/or may have a slight concavity. Alternatively, some of these lures are cast with a relatively thick body and may include aerodynamic protrusions. It is not believed however that any of such lures bear any resemblance to Applicant's new arcuate jigging spoon, none exhibit a comparable end-on profile.

SUMMARY OF THE INVENTION

It is accordingly a primary object of the present invention to provide a fishing lure having lengthwise arcuate body shape formed over its length at a predetermined radius of curvature.

It is a further object of the invention to provide a body having a relatively wider, hook receiving end and a relatively narrow line attaching opposite end, when viewed from either the top or bottom.

It is a yet further object of the invention to provide a lure which presents a V-shaped concavity over its length on the convex side of the lure body's curvature, which concavity is presented as the lure falls and/or is drawn through the water.

It is a still further object of the invention to provide such a lure in a stamped metal construction.

The foregoing objects, advantages and distinctions of the present invention are particularly achieved in one construction which is described hereinafter with respect to the appended drawings. While such a construction represents the presently preferred construction, it is to be appreciated still other constructions may suggest themselves to those of skill in the art. The following description should therefore not be interpreted in limitation of the spirit of the invention claimed hereinafter.

DESCRIPTION OF THE PREFERRED EMBODIMENT

Figure 1:
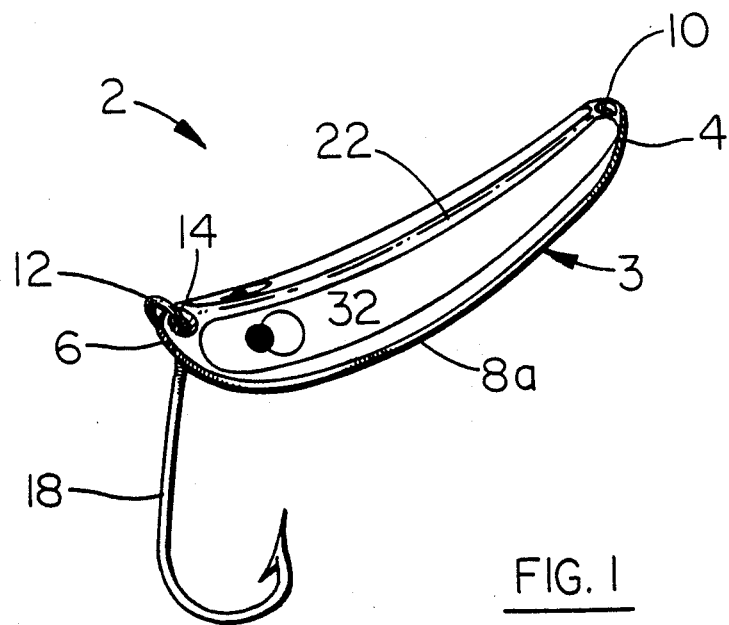
FIG. 1 shows an isometric view of the aft surface of the lure of the present invention.
Figure 2:
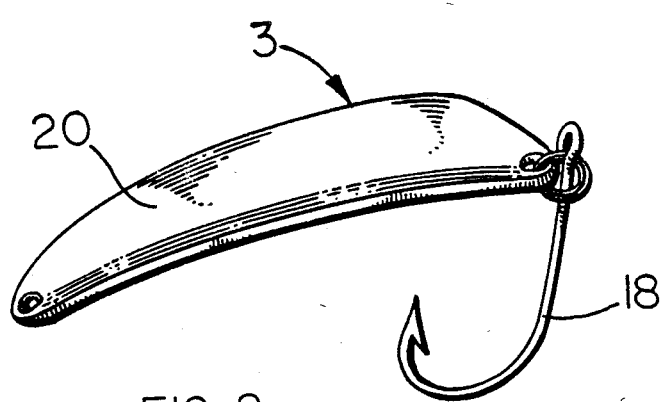
FIG. 2 shows an isometric view of the forward surface of the lure of the present invention.
Figure 3:
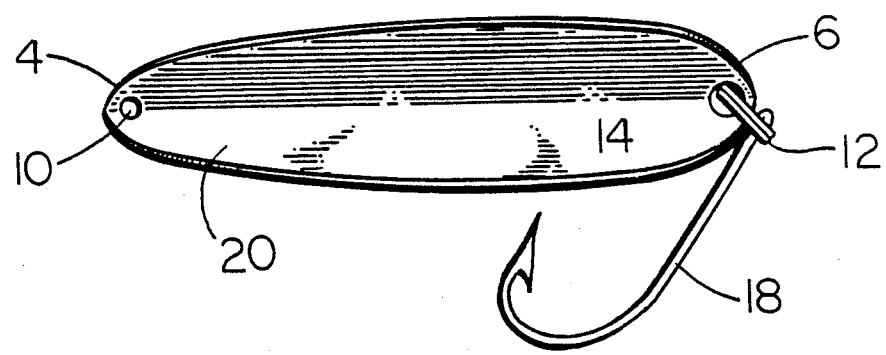
FIG. 3 shows a plan view of the forward surface.
Figure 4:
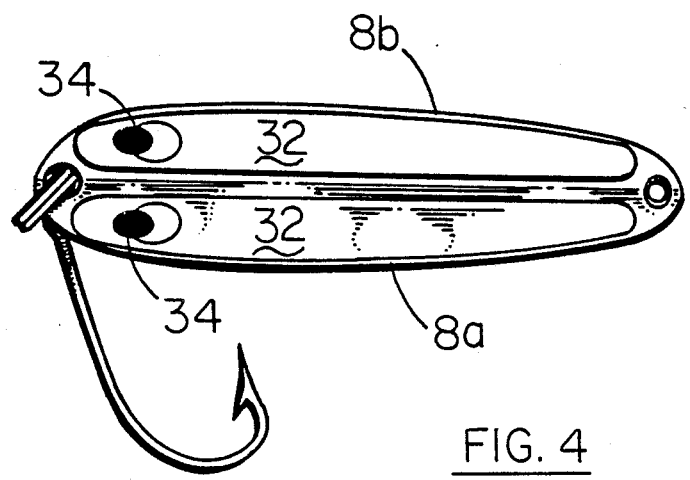
FIG. 4 shows a plan view of the aft surface lure.
Figure 5:
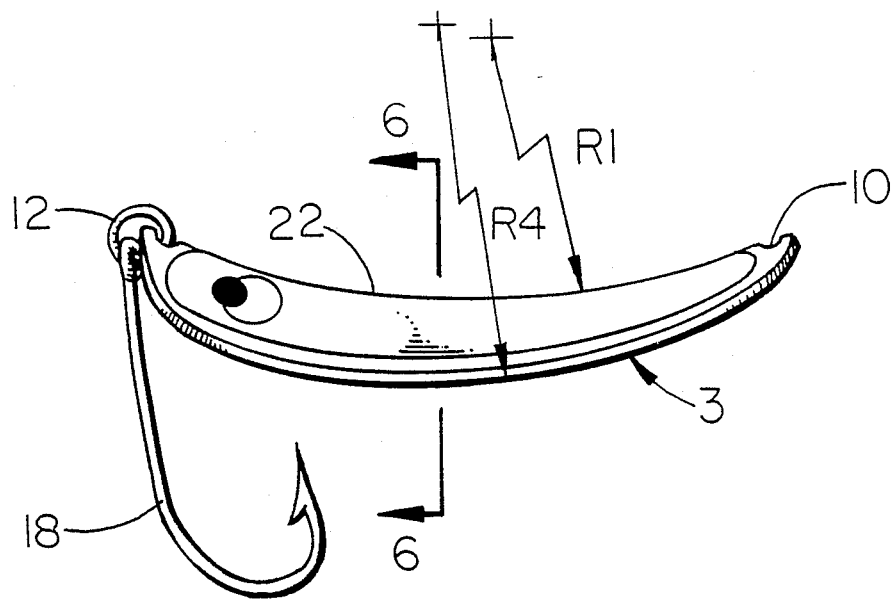
FIG. 5 shows a side elevation view of the lure.
Figure 6:
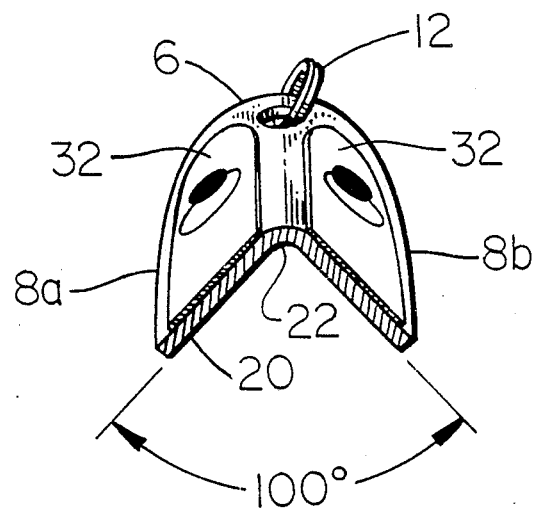
FIG. 6 shows a cross-section view taken through the lure along section lines 6—6 of FIG. 5.

Referring to FIGS. 1-5, FIGS. 1 and 2 show isometric views of the lure 2 of the presently preferred construction of the invention from respective aft rear and forward surfaces, while FIGS. 3 and 4 show the corresponding plan views. FIG. 5, in turn, shows a side elevation view of the lure 2. As depicted, it is to be appreciated that the body 3 of the lure 2 is constructed to exhibit a generally uniform radius of curvature R1 (reference FIG. 5) from the line receiving end 4 to the hook receiving end 6. The body 3 is further bent along its length to form a continuous V-shaped cross sectional profile or concavity 20 over its length when viewed end on. The V-shaped construction can particularly be seen in the cross section view of FIG. 6, taken along reference lines of 6–6 of FIG. 5.

Formed at the forward or line receiving end of the lure 2 is an aperture 10 whereat a fishing line is secured directly or via a snap or snap-swivel (not shown). A split ring 12 is mounted through the aperture 14 at the rear end of the lure 2. Secured, in turn, to the snap ring 12 is either a single barbed (as shown) or a multi-barbed hook 18, depending upon the preference of the fisherman. In normal use, the lure is suspended such that the V-shaped concavity 20 is presented to the water with the lure's travel therethrough.

While the arcuately curved body shape generally produces a swimming or side-to-side swaying action in the lure, the concavity 20 induces a slight turbulence which accentuates this motion. It also provides a parachute-like effect when the lure 2 falls in the water. This parachute-like action is particularly desirable when jigging the lure with either a lifting/falling or lifting/-dragging action. Thus, the lure 2 swims not only as it is drawn by the line but also as it falls and when a high percentage of fish strikes occur.

As presently constructed, the body 3 is bent along its longitudinal midline such that the formed apex or ridge 22 bisects the lure 2. In various other constructions, however, it might be preferable to bend the body 3 slightly offset from the longitudinal midline 16 which would induce an action favoring motion to one side or the other. Moreover and in lieu of a V-shaped concavity 20, an arcuate or radiused concave bend might be used. At present, however, the V-shaped concavity 20 in combination with the forming of the body to the radii R1 at the apex and R4 at the peripheral edges provides a desired action.

While too each of the body halves 8a and 8b are formed at a 50 degree angle relative to a vertical plane through the longitudinal midline 16 or a combined 100 degree angle, other angles may also be employed, just as different radii R are used depending upon the body size. That is, the radius R1 might be varied from the present 3⅜ inches on lure body sizes 2, 3, 4 and 6 to 2½ inches on a size 1 lure. The corresponding length of the lure body for each of these sizes is approximately 1 inch, 1⅜, 1⅝, 2¼ and 2⅜ inches. Depending upon the body size, the hook size may also be correspondingly varied.

Figure 7:
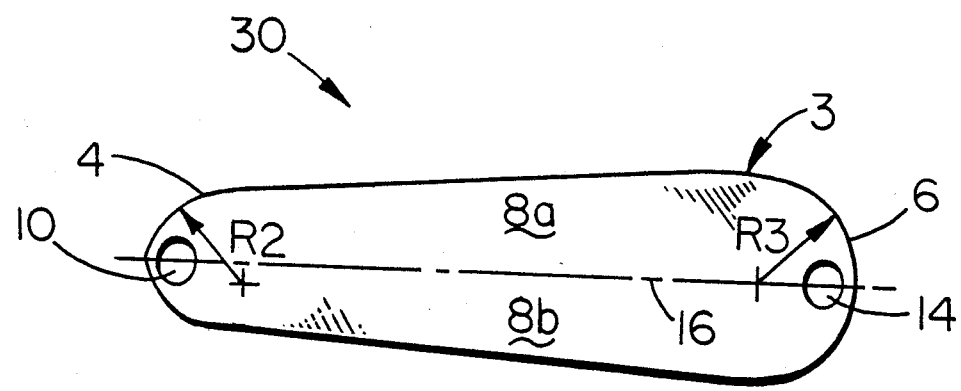
FIG. 7 shows a plan view of a flat lure blank, prior to stamping.

With attention next directed to FIG. 7, a view is shown of a typical body blank 30 from which the present lure is constructed. Generally, the blank 30 comprises a flat oblong or teardrop member, the forward end 4 of which is narrower that the rear end 6. Each of the peripheral edges is formed in tangential alignment with the radii R2 and R3 of the ends 4 and 6. Again, while depending upon lure size the curvatures radii R2 and R3 may vary.

Otherwise, when forming the lure 2, the blank 30 is first stamp formed to the size and shape shown. Holes 10 and 14 are simultaneously let into the blank 30. The blank 30 is then inserted into a forming dye and stamped or pressed to conform to the shape shown in FIGS. 1 through 6. As the lure is thus formed, the peripheral edges also tend to curve slightly.

At present, the lure 2 is constructed of 1/16 inch thick mild steel sheet stock which is plated over with a silver finish. Alternatively, other metals and thicknesses and a variety of other plating finishes from copper to gold to hammered metal appearances maY be used. Once shaped a pair of reflective scaled tape members 32 having contrasting eyes 34 printed on their lower ends are adhesively bonded to each the aft surfaces of the body portions 8a and 8b. The color combinations and mounting of such tape members 32 may however be adjusted as desired. In lieu also of providing a pair of members 32, a single tape member might be used to cover over the entire rear surface. Similarly, appropriate coloring might be added to the V-shaped concavity 20 as desired. Conventional painting techniques might also be used.

While the present invention has been described with respect to its presently preferred embodiment, it is to be appreciated still other embodiments might suggest themselves to those of skill int he art. Accordingly, it is contemplated that the following claims should be interpreted to include all those equivalent embodiments within the spirit and scope thereof.

What is claimed is:

1. A fishing lure comprising a body having a fore and an aft end and peripheral edges extending therebetween and including means for securing a hook to said body and further including first and second planar body portions convergent at a substantially uniform angular displacement over the length of the lure to form a lengthwise extending apex coincident with a longitudinal axis, such that when viewed end-on said body exhibits a V-shaped concavity and when viewed side-on said apex arcuately extends back upon itself at a first radius less than a second radius exhibited by the peripheral edges, whereby upon use of said lure during a downward free floating descent, said lure orients so that said concavity will be lower than said apex as viewed end-on.

2. A lure as set forth in claim 1 wherein the angle between the first and second body portions is in the range of 80 to 120 degrees.

3. A lure as set forth in claim 1 wherein said first radius of curvature is constant over the length of the lure.

4. A lure as set forth in claim 3 wherein said first radius as in the range of 1½ to 5 inches.

5. A lure as set forth in claim 1 including at least one colored member adhesively bonded to said body portion.

6. A lure as set forth in claim 1 wherein said body exhibits a metallic finish selected from a class of metals including nickel, silver, copper, gold and brass.

7. A lure as set forth in claim 6 wherein the finish is dimpled over a substantial portion of the lure.

8. A lure as set forth in claim 1 wherein said body is formed from a flat blank member wherein when viewed from above the fore end exhibits a third radius of curvature and the aft end exhibits a fourth radius of curvature less than said third radius.

9. A fishing lure comprising:
(a) flattened body blank having a fore end exhibiting a first radius of curvature and an aft end exhibiting a second radius of curvature greater than said first radius and peripheral edges extending therebetween and when formed to shape includes first and second substantially planar portions convergent at a substantially uniform angular displacement over the length of the lure to form a lengthwise extending apex coincident with a longitudinal center axis, such that when viewed end-on said body exhibits a V-shaped concavity and when viewed side-on, said apex over its length arcuately extends back upon itself at a third radius of curvature less than a fourth radius exhibited by the peripheral edges;

(b) a hook; and (c) means for securing said hook to said body whereby, upon use of said lure during a downward free floating descent, said lure orients so that said concavity will be lower than said apex as viewed end on.

10. A lure as set forth in claim 9 wherein the angle between the lengthwise peripheral edges is in the range of 80 to 120 degrees and the radius of curvature of the apex is in the range of 1½ to 5 inches.

* * * * *